US012748082B2

(12) United States Patent
Zhang

(10) Patent No.: US 12,748,082 B2
(45) Date of Patent: Sep. 29, 2026

(54) MULTIPORT GAS CHROMATOGRAPH VALVE

(71) Applicant: Rosemount Inc., Shakopee, MN (US)

(72) Inventor: Edward Zhang, Cypress, TX (US)

(73) Assignee: Rosemount Inc., Shakopee, MN (US)

( * ) Notice: Subject to any disclaimer, the term of this patent is extended or adjusted under 35 U.S.C. 154(b) by 169 days.

(21) Appl. No.: 18/751,687

(22) Filed: Jun. 24, 2024

(65) Prior Publication Data

US 2026/0098839 A1 Apr. 9, 2026

(51) Int. Cl.
*G01N 30/20* (2006.01)
*F16K 11/02* (2006.01)
*F16K 31/126* (2006.01)

(52) U.S. Cl.
CPC ............ *G01N 30/20* (2013.01); *F16K 11/022* (2013.01); *F16K 31/1266* (2013.01); *G01N 2030/201* (2013.01)

(58) Field of Classification Search
CPC .............. G01N 30/20; G01N 2030/201; F16K 11/022; F16K 31/1266
(Continued)

(56) References Cited

U.S. PATENT DOCUMENTS

93 A 11/1836 Jones
120 A 2/1837 Fairbanks
(Continued)

FOREIGN PATENT DOCUMENTS

CN 112610722 A 4/2021
CN 115427799 B 1/2026
(Continued)

OTHER PUBLICATIONS

Siemens, A5E42019844001 Maxum II Valves and Oven Components, Service Manual, Oct. 2018, 110 pages.
(Continued)

*Primary Examiner* — Peter J Macchiarolo
*Assistant Examiner* — John M Royston
(74) *Attorney, Agent, or Firm* — Christopher R. Christenson; Kelly, Holt & Christenson, P.L.L.C.

(57) ABSTRACT

A multiport gas chromatograph valve includes a first plate, a second plate, and a diaphragm. The first plate has a first plurality of ports and a second plurality of ports. The first and second plurality of ports are interposed with one another such that each of the first plurality of ports has a pair of neighbors from the second plurality of ports and each of the second plurality of ports has a pair of neighbors from the first plurality of ports. The second plate has a first activation port and a second activation port, the first activation port being fluidically coupled to a first plurality of gas slots, and wherein the second activation port is fluidically coupled to a second plurality of gas slots. The diaphragm is disposed between the first and second plates and has a first plurality of gas pockets that, when pressurized by the first plurality of gas slots, seals against the first plate to obstruct flow between each port of the first plurality of ports and a respective neighbor on a first side, and wherein the diaphragm has a second plurality of gas pockets that, when pressurized by the second plurality of gas slots, seals against the first plate to obstruct flow between each port of the first plurality of ports and a respective neighbor on a second side.

13 Claims, 10 Drawing Sheets

(58) Field of Classification Search
USPC .............................................................. 73/271
See application file for complete search history.

(56) References Cited

U.S. PATENT DOCUMENTS

| | | | |
|---|---|---|---|
| 1,040 A | 12/1838 | Ruggles | |
| 3,545,491 A | 12/1970 | Broerman | |
| 3,975,946 A | 8/1976 | Ball et al. | |
| 4,869,282 A * | 9/1989 | Sittler | F16K 99/0015 137/15.01 |
| 5,587,520 A | 12/1996 | Rhodes | |
| 6,067,864 A | 5/2000 | Peterson | |
| 6,227,034 B1 | 5/2001 | Trochesset | |
| 6,453,725 B1 | 9/2002 | Dahlgren et al. | |
| 6,601,606 B2 | 8/2003 | Xu et al. | |
| 7,347,080 B2 | 3/2008 | Mahoney et al. | |
| 7,485,176 B2 | 2/2009 | Bentley et al. | |
| 9,249,890 B2 | 2/2016 | Pratt et al. | |
| 9,335,307 B2 | 5/2016 | Wang et al. | |
| 9,389,208 B2 | 7/2016 | Bailey et al. | |
| 9,632,065 B2 | 4/2017 | Gamache | |
| 10,060,865 B2 | 8/2018 | Ruth et al. | |
| 10,060,866 B2 | 8/2018 | Gellert et al. | |
| 10,401,330 B2 | 9/2019 | Richter et al. | |
| 11,448,623 B2 | 9/2022 | Simard-Lecours et al. | |
| 11,506,643 B2 | 11/2022 | Zhang et al. | |
| 12,253,497 B2 | 3/2025 | May et al. | |
| 2008/0291966 A1 | 11/2008 | Engel et al. | |
| 2009/0014078 A1 | 1/2009 | Gamache et al. | |
| 2011/0233440 A1 | 9/2011 | Gamache et al. | |
| 2013/0239656 A1 | 9/2013 | Wang et al. | |
| 2015/0219578 A1 | 8/2015 | Gellert | |
| 2016/0219578 A1 | 7/2016 | Lim et al. | |
| 2018/0094522 A1 | 4/2018 | Van Hal et al. | |
| 2019/0000489 A1 | 1/2019 | McCoy et al. | |
| 2019/0242859 A1 | 8/2019 | Schmidt | |
| 2019/0250131 A1 | 8/2019 | Yoshida | |
| 2020/0088697 A1 | 3/2020 | Nakama | |
| 2023/0266280 A1 * | 8/2023 | May | G01N 30/88 73/23.42 |

FOREIGN PATENT DOCUMENTS

| | | | |
|---|---|---|---|
| EP | 0400016 B1 | 4/1995 |
| EP | 0829716 A1 | 3/1998 |
| EP | 3524975 A1 | 8/2019 |
| JP | 2019082434 A | 5/2019 |
| JP | 2020041990 A | 3/2020 |
| WO | 2007028130 A2 | 3/2007 |
| WO | 2019144228 A1 | 8/2019 |
| WO | 2021119816 A1 | 6/2021 |

OTHER PUBLICATIONS

Siemens Maxum Edition II Detectors—Service Manual, https://cache.industry.siemens.com/dl/files/764/109757764/att_951875/v1/A5E42019847001-Maxum-Edition-II-Detectors.pdf, Dated May 2018, 58 pages.
Application and Drawings for U.S. Appl. No. 18/619,768, filed Mar. 28. 2024, 18 pages.
Application and Drawings for U.S. Appl. No. 18/619,863, filed Mar. 28, 2024, 20 pages.
International Search Report and Written Opinion for International Application No. PCT/US2025/033452, mailed Oct. 22, 2025, 12 Pages.
International Search Report and Written Opinion for International Application No. PCT/US2025/021461, dated Jul. 2, 2025, 7 Pages.
International Search Report and Written Opinion for PCT Application No. PCT/US2025/021451, dated Jun. 25, 2025, 9 pages.
Non-Final Office Action for U.S. Appl. No. 18/619,768, mailed Feb. 23, 2026, 10 Pages.
Non-Final Office Action for U.S. Appl. No. 18/619,863, mailed Feb. 26, 2026, 07 Pages.
Notice of Allowance for U.S. Appl. No. 18/619,863, dated Apr. 27, 2026, 09 Pages.
Notice of Allowance for U.S. Appl. No. 18/619,863, dated Jun. 18, 2026, 02 Pages.

* cited by examiner

MULTIPORT GAS CHROMATOGRAPH VALVE

BACKGROUND

Gas chromatography is the separation of a mixture of chemical compounds due to their migration rates through a chromatographic column. This separates the compounds based on differences in boiling point, polarity, or molecular size. The separated compounds then flow across a suitable detector, such as a thermal conductivity detector (TCD) that determines the concentration of each compound represented in the overall sample. Knowing the concentration of the individual compounds makes it possible to calculate certain physical properties such as BTU or specific gravity using industry-standard equations.

A gas chromatograph is an analyzer that passes a small volume of gas through chromatographic columns to separate and individually measure the unique gas components of the sample mixture. The analysis cycle can be split into two general phases. The first phase is a sample injection phase, and the second phase is the separation and measurement phase.

Multiport valves are used in gas chromatographs for a number of reasons. One of the reasons is precise sample injection. Multiport valves enable reproducible and accurate injection of small sample volumes (typically microliters) into the carrier gas stream. This is achieved through a loop injector design, where the sample is trapped in a loop before being injected onto the column. The multiport valve controls the flow of gas to fill and empty the loop, ensuring consistent injection every time. Another reason multiport valves are used is for flow path switching. Multiport valves can direct the flow of gases within the gas chromatography system. This allows for different configurations depending on the analysis needs. For example, such valves can direct the sample to the column, bypass the column for purging, or switch between different columns for multidimensional separation. This versatility improves the flexibility and functionality of the GC system. Still another reason multiport valves are used is for automation. Multiport valves are easily actuated with pneumatic or electronic controls, facilitating automated operation of the GC system. This significantly improves efficiency and reduces human error compared to manual valve manipulation.

SUMMARY

A multiport gas chromatograph valve includes a first plate, a second plate, and a diaphragm. The first plate has a first plurality of ports and a second plurality of ports. The first and second plurality of ports are interposed with one another such that each of the first plurality of ports has a pair of neighbors from the second plurality of ports and each of the second plurality of ports has a pair of neighbors from the first plurality of ports. The second plate has a first activation port and a second activation port, the first activation port being fluidically coupled to a first plurality of gas slots, and wherein the second activation port is fluidically coupled to a second plurality of gas slots. The diaphragm is disposed between the first and second plates and has a first plurality of gas pockets that, when pressurized by the first plurality of gas slots, seals against the first plate to obstruct flow between each port of the first plurality of ports and a respective neighbor on a first side, and wherein the diaphragm has a second plurality of gas pockets that, when pressurized by the second plurality of gas slots, seals against the first plate to obstruct flow between each port of the first plurality of ports and a respective neighbor on a second side.

DETAILED DESCRIPTION OF ILLUSTRATIVE EMBODIMENTS

Figure 1A:
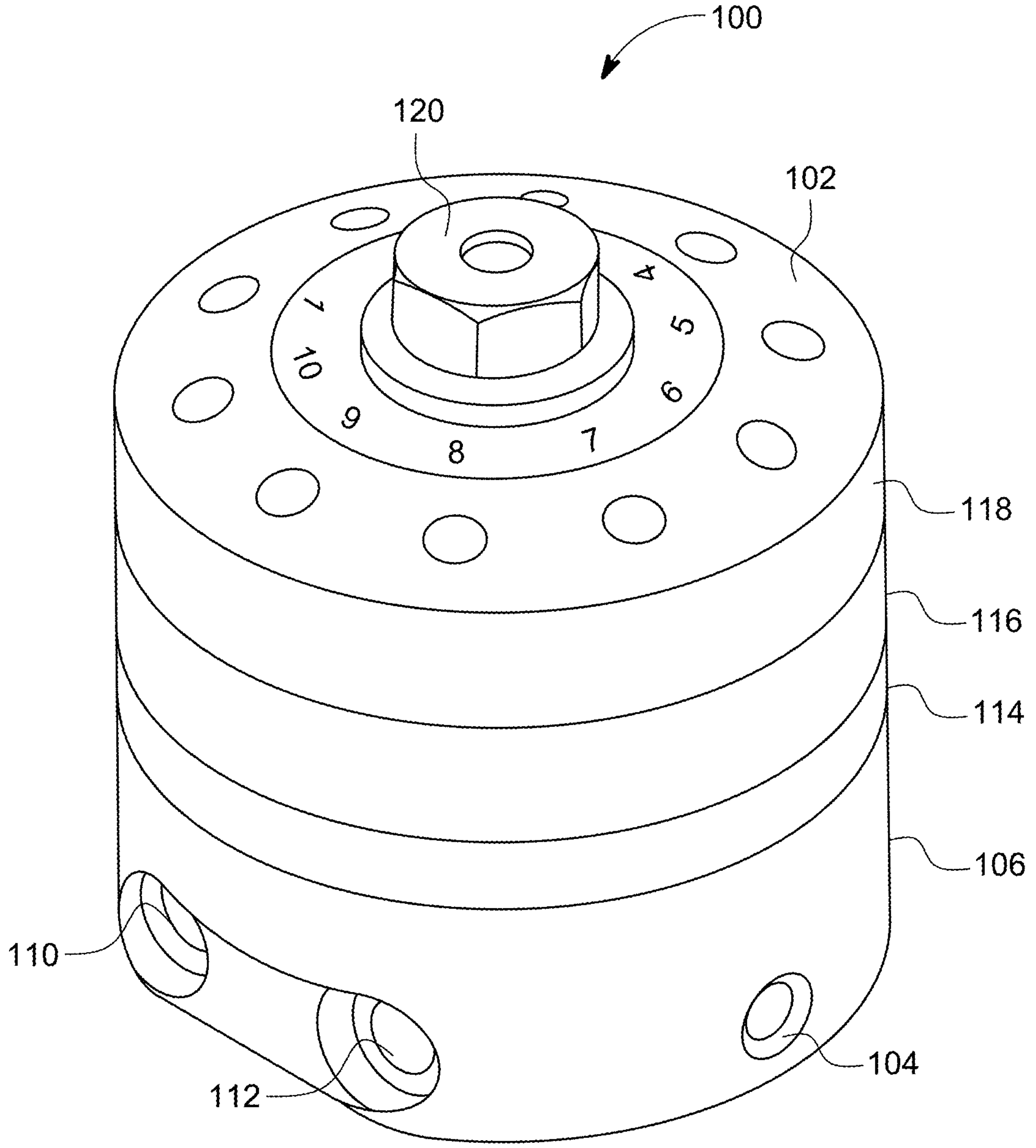
FIG. 1A (Prior Art)
FIG. 1A is a perspective view of a multiport piston diaphragm analytical valve in accordance with the prior art.

FIG. 1A is a perspective view of a multiport piston diaphragm analytical valve widely used in the chromatography industry. Valve 100 is shown having 10 different ports labeled 1-10 on a top surface 102 thereof. Valve 100 includes an actuation port 104 in plate 106 as well as a similar actuation port 108 (shown in FIG. 1B) on an opposite side of plate 106. Plate 106 also includes a pair of mounting holes 110, 112 for installation. As can be seen in FIG. 1A, valve 100 is comprised of four plates: 106, 114, 116, and 118. The plates are compressed together by fastener 120.

Figure 1B:
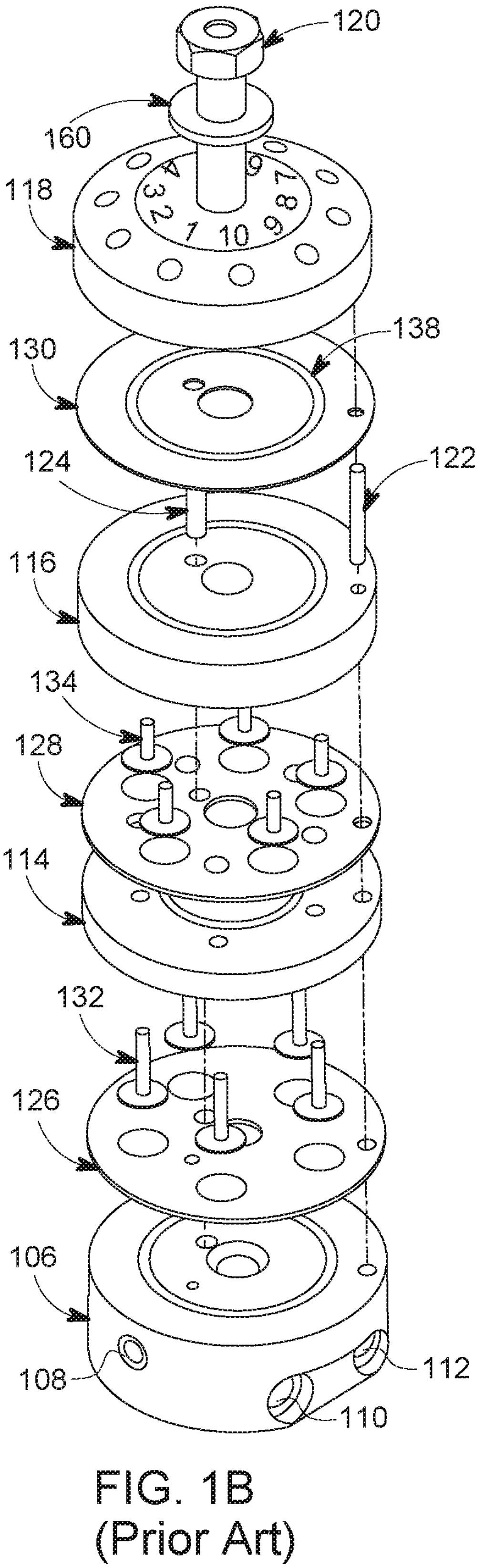
FIG. 1B (Prior Art)
FIG. 1B is an exploded view of a multiport piston diaphragm analytical valve in accordance with the prior art.

FIG. 1B is an exploded view of the multiport piston diaphragm analytical valve shown in FIG. 1A. As shown in FIG. 1B, valve 100 includes a pair of alignment pins 122, 124 that extend into plates 106 and 118 and through plates 114 and 116. Additionally, alignment pins extend through diaphragms 126, 128, and 130. A set of lower pistons 132 is positioned adjacent diaphragm 126 while a set of upper pistons 134 is positioned adjacent diaphragm 128. Constrained by space, lower pistons 132 are housed in plate 114, while upper pistons 134 are housed in plate 116. By moving lower pistons 132 or upper pistons 134 upwards to compress gas path 138 against the bottom surface of plate 118, lower pistons 132 and/or upper pistons 134 can seal gas flow through the gas path 138 of upper diaphragm 130 to stop analytical gases (sample and carrier) from one port to another. By alternatively moving lower pistons 132 and upper pistons 134, gas flow among the various ports 1-10 on plate 118 can be switched.

Figure 1C:
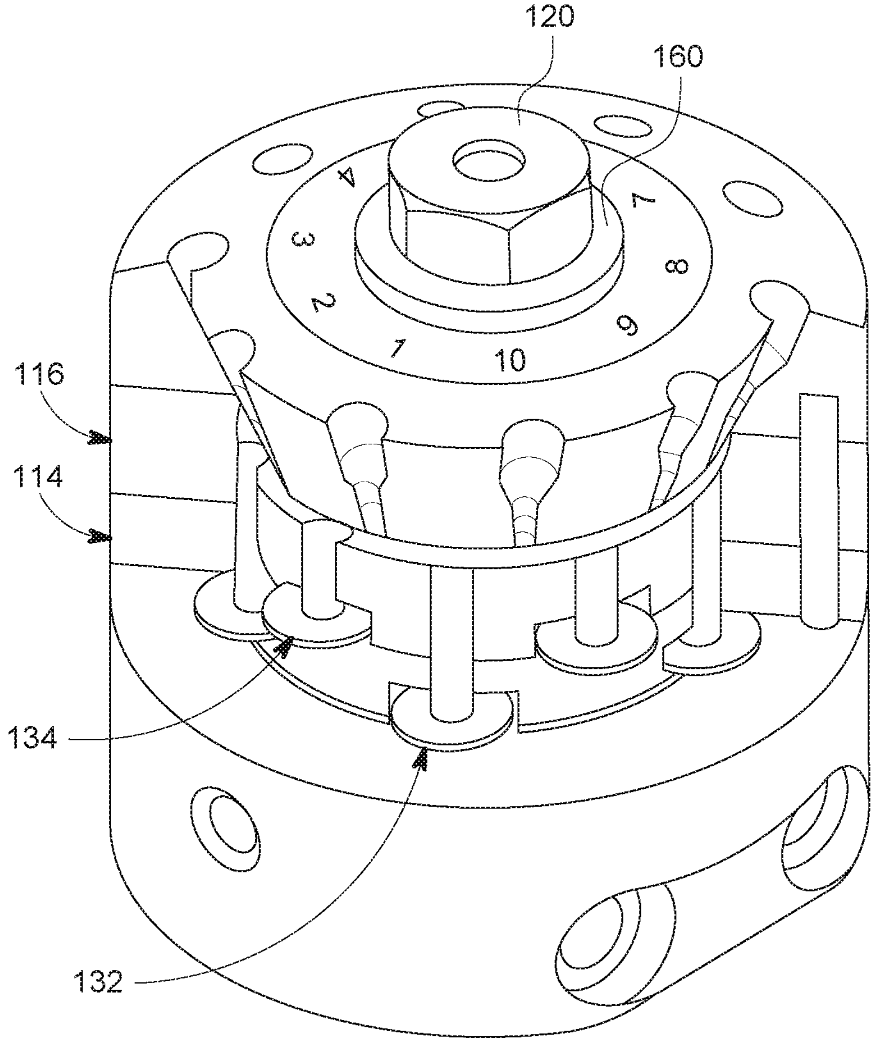
FIG. 1C (Prior Art)
FIG. 1C is a perspective partial cutaway view of a multiport piston diaphragm analytical valve in accordance with the prior art.
Figure 1D:
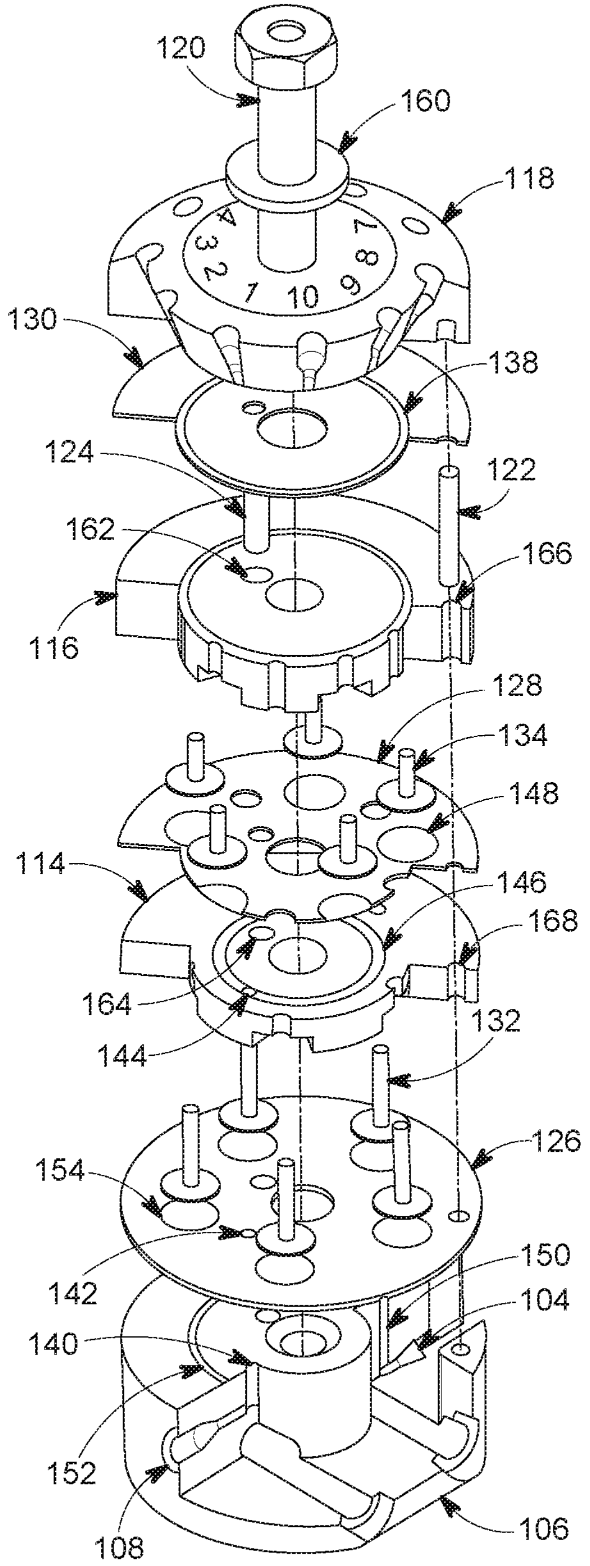
FIG. 1D (Prior Art)
FIG. 1D is an exploded partial cutaway view of a multiport piston diaphragm analytical valve in accordance with the prior art.

Referring to FIGS. 1D and 1C, by pressurizing port 108, activation gas goes through holes 140, 142, and 144 to pressurize gas slot 146 on plate 114, which pressurizes gas pockets 148 on diaphragm 128 and pushes upper pistons 134 upwards against gas flow path 138 on diaphragm 130 to seal analytical gas flows. In this case, analytical gases (sample and/or carrier) pressurize gas flow path 138, which pushes lower pistons 132 down and allows flow through ports 10 to 1, 2 to 3, 4 to 5, 6 to 7, and 8 to 9.

Referring to FIGS. 1D and 1C, by pressurizing port 104, activation gas goes through holes 150, to pressurize slot 152 on plate 106, which pressurizes gas pockets 154 on diaphragm 126 and pushes lower pistons 132 upwards against flow path 138 on diaphragm 130 to seal analytical gas flows. In this case, analytical gases (sample and/or carrier) pressurize gas flow path 138, which pushes upper pistons 134 downward, and allows flow through ports 1 to 2, 3 to 4, 5 to 6, 7 to 8, and 9 to 10.

Referring to FIGS. 1B and 1C, one limitation of multiport valves that employ relatively long pistons, such as lower pistons 132, is that the pistons must pass through both plates 114 and 116. During valve assembly, torque is applied to fastener 120. Partial tightening torque is transferred from fastener 120 through washer 160, plate 118, diaphragm 130, plate 116, diaphragm 128, plate 114, and diaphragm 126 to plate 106 by friction. The relative positions of plate 118, diaphragm 130, plate 116, diaphragm 128, plate 114, diaphragm 126, and plate 108 are constrained by pins 122, 124.

Referring to FIG. 1D, the fits between pin 122 and holes on plate 106, plate 114, plate 116, and plate 118 are clearance fits for manufacturability and serviceability. Clearance fits also apply to pin 124. The relative position between plates 116 and 114 shifts due to the clearance between pin 124 and holes 162 and 164 as well as the clearance between pin 122 and holes 166 and 168. The relative position between plates 114 and 116 can also shift due to the deformation of pin holes 162, 166 caused by high tightening toque during assembly. The shift between plate 116 and plate 114 can cause binding of lower pistons 132 because pistons 132 pass through both plate 114 and plate 116. The binding or restriction of free movement of lower pistons 132 can cause gas to leak and/or blockage between ports, which can adversely affect operation of the multiport valve.

Figure 2A:
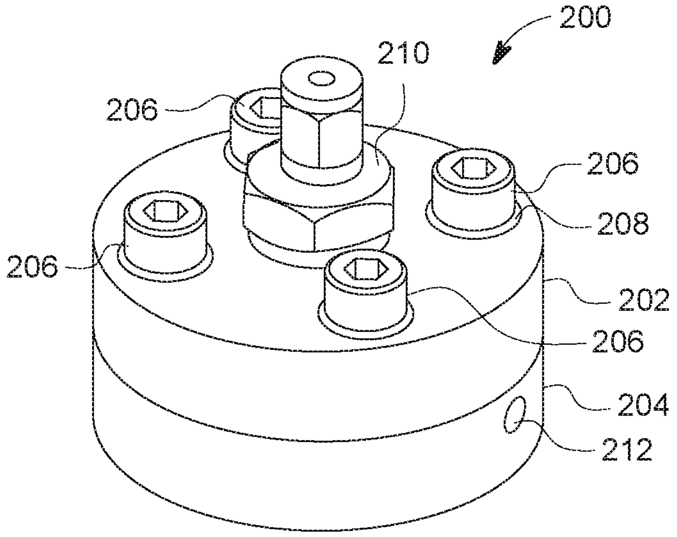
FIG. 2A (Prior Art)
FIG. 2A is a perspective view of a known diaphragm-type multiport valve.

FIG. 2A is a perspective view of a known diaphragm-type multiport valve. Valve 200 is formed by a pair of plates 202, 204 clamped together by fasteners 206 and washers 208. A fitting 210 is engaged within plate 202 and is configured to receive activation gas. When activation gas flows through fitting 210, gas flow between port 212 and port 214 (shown in FIG. 2C) is blocked.

Figure 2B:
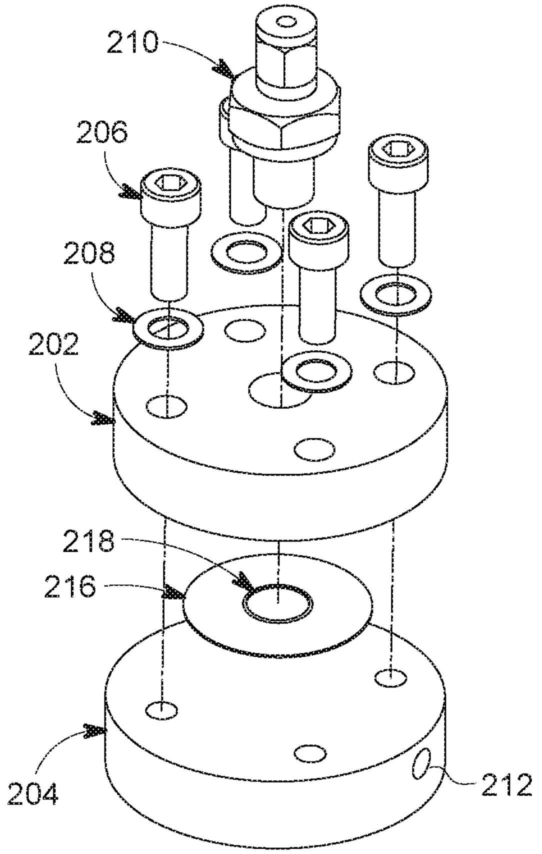
FIG. 2B (Prior Art)
FIG. 2B is an exploded view of a known diaphragm-type multiport valve.

FIG. 2B is an exploded view of a known diaphragm-type multiport valve. FIG. 2B shows diaphragm 216 positioned between plates 202 and 204. Diaphragm 216 has a gas pocket 218 disposed therein.

Figure 2C:
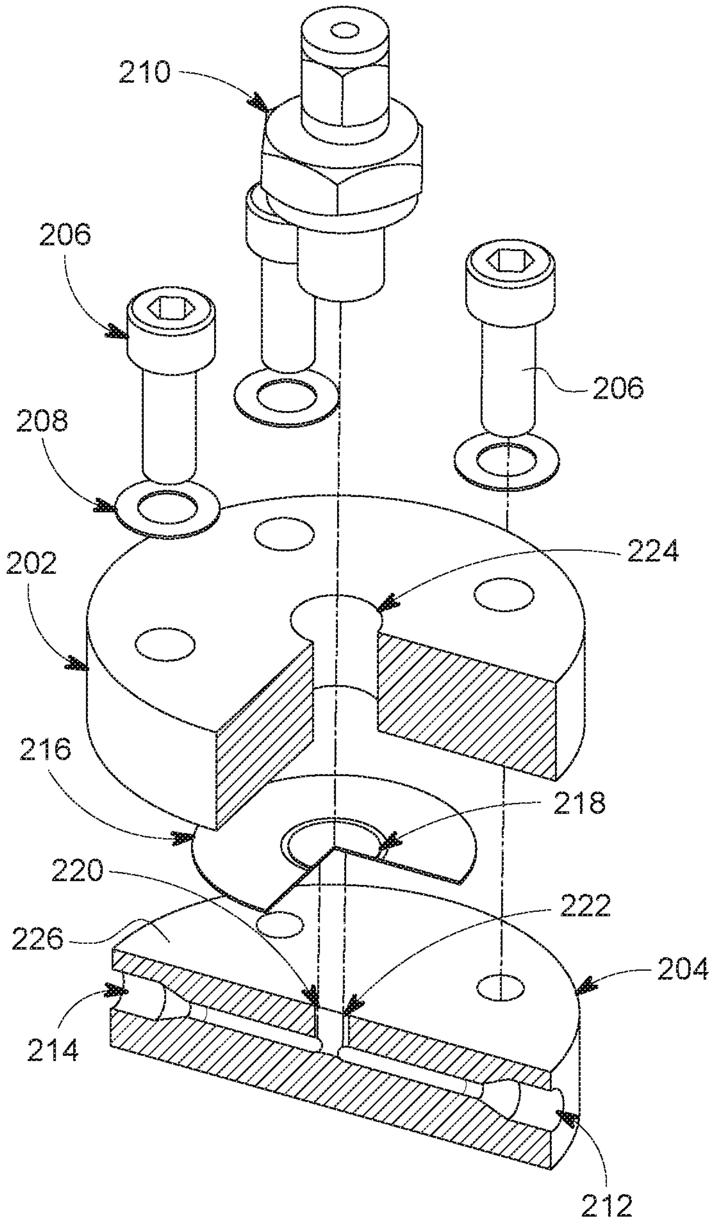
FIG. 2C (Prior Art)
FIG. 2C is an exploded partial cutaway view of a known diaphragm-type multiport valve.

FIG. 2C is an exploded partial cutaway view of a known diaphragm-type multiport valve. When no activation gas is applied to fitting 210, gas flows through port 214 to port 212. More particularly, gas enters valve 200 through port 214 to hole 220 on plate 204 to enter gas pocket 218 on diaphragm 216. Gas continually flows through hole 222 and exits valve 200 through port 212. When activation gas flows through fitting 210 to hole 224 on plate 202 and pushes gas pocket 218 on diaphragm 216 against top surface 226 of plate 204, gas pocket 218 on diaphragm 216 seals both holes 220, 222 on plate 204 thereby preventing gas flow between holes 220 and 222. Thus, gas flow from port 214 to port 212 is also blocked.

Figure 3A:
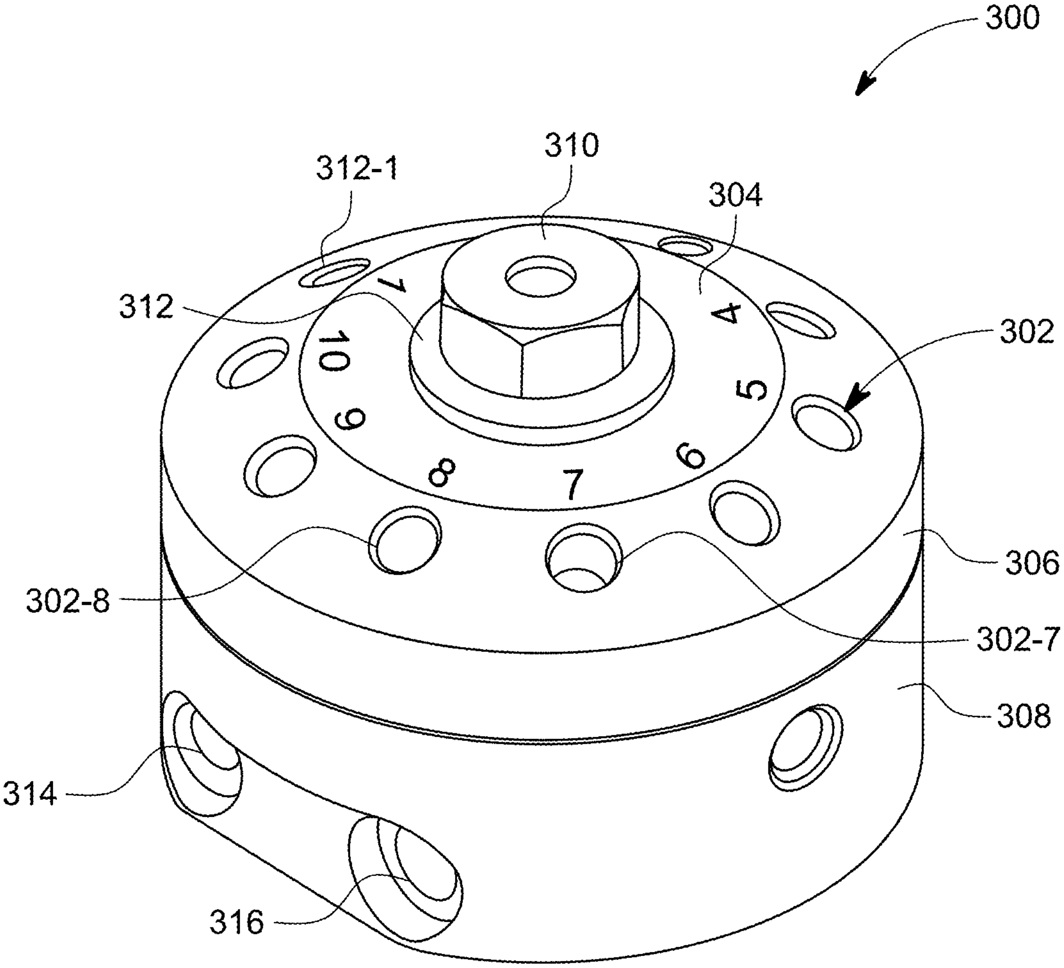
FIG. 3A is a perspective view of a multiport diaphragm valve in accordance with an embodiment of the present invention.

FIG. 3A is a perspective view of a multiport diaphragm valve in accordance with an embodiment of the present invention. Valve 300 includes a number of ports 302 labelled 1-10 on a top surface 304 of valve 300. Valve 300 is comprised of a pair of plates 306, 308 clamped together with a single fastener 310 and washer 312. Mounting holes 314, 316 are for installation.

Figure 3B:
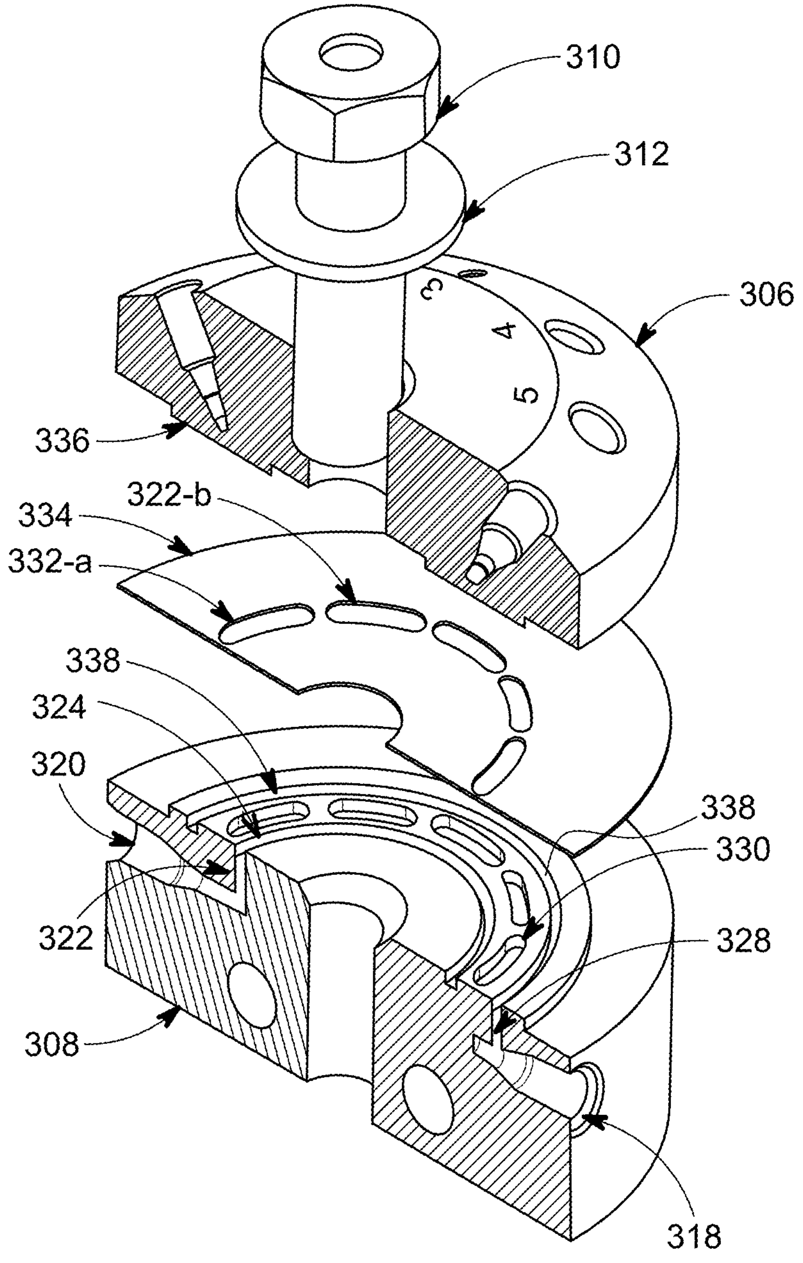
FIG. 3B is an exploded cutaway view of a multiport diaphragm valve in accordance with an embodiment of the present invention.

FIG. 3B is an exploded cutaway view of a multiport diaphragm valve in accordance with an embodiment of the present invention. FIG. 3B shows a pair of activation ports 318, 320 disposed on opposite sides of lower plate 308.

Figure 3C:
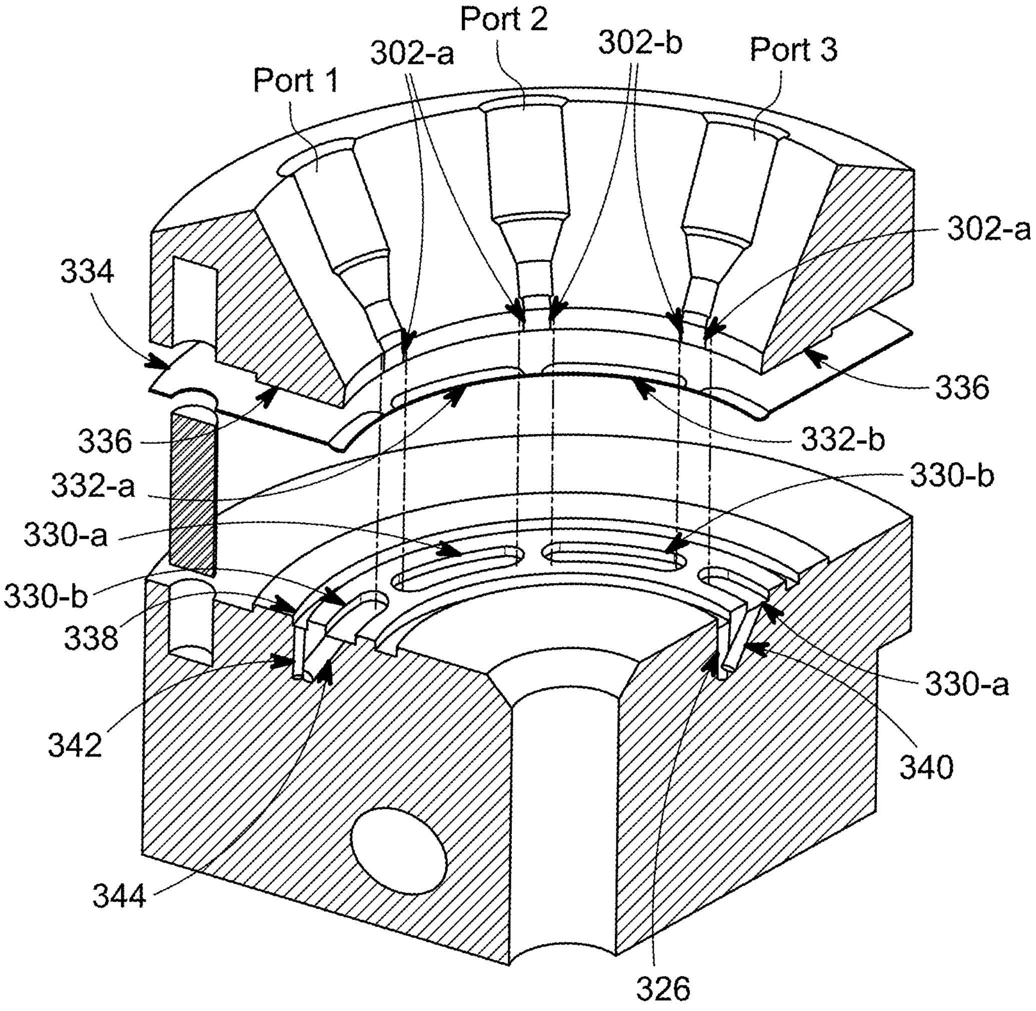
FIG. 3C is an enlarged partial cutaway view of a portion of a multiport diaphragm valve in accordance with an embodiment of the present invention.
Figure 3D:
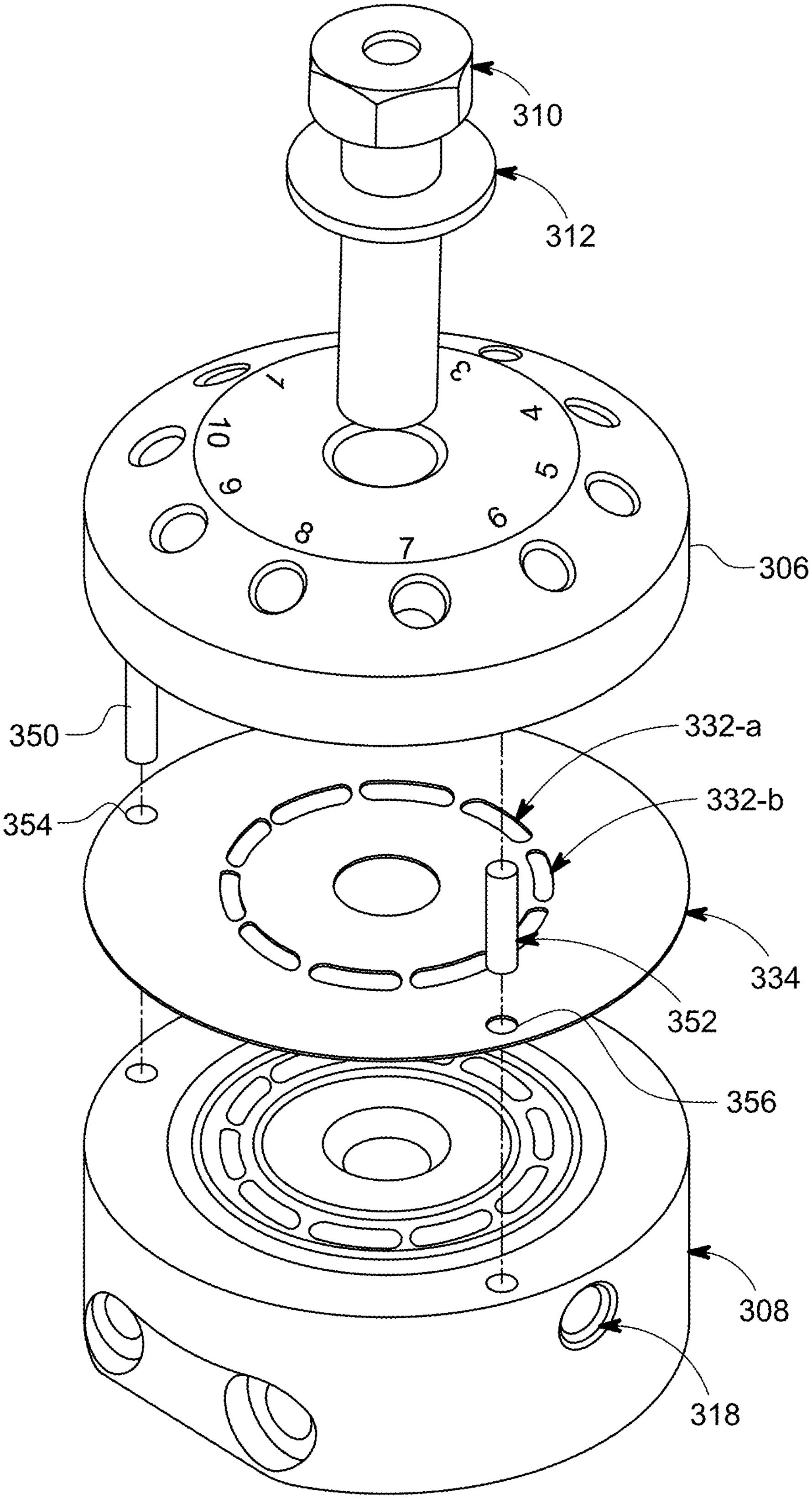
FIG. 3D is an exploded perspective view of a multiport diaphragm valve in accordance with an embodiment of the present invention.

FIG. 3C is an enlarged partial cutaway view of a portion of a multiport diaphragm valve in accordance with an embodiment of the present invention. FIG. 3D shows that some oval gas slots 330 (labeled as 330-*a*) are fluidically connected to inner gas slot 324 while other oval gas slots 330 (labeled 330-*b*) are fluidically coupled to outer gas slot 338 of plate 308.

Referring to FIGS. 3B and 3C, by pressurizing activation port 320, activation gas flows through hole 322, inner gas slot 324 of lower plate 308, holes 326 and 340 to pressurize oval gas slots 330-*a*. Pressurized oval gas slots 330-*a* urge gas pockets 332-*a* in diaphragm 334 upwards against bottom surface 336 of upper plate 306 to seal side holes 302-*a* and prevent analytical gasses (sample and carrier) from flowing from ports 1 to 2, 3 to 4, 5 to 6, 7 to 8, and 9 to 10. Analytical gases push gas pockets 332-*b* down to allow gas flow through side holes 302-*b* thereby allowing flow between ports 10 to 1, 2 to 3, 4 to 5, 6 to 7, and 8 to 9 while depressurizing activation port 318.

By pressurizing activation port 318, activation gas flows through holes 328, outer gas slot 338 of plate 308, holes 342 and 344 to pressurize oval gas slots 330-*b*. Pressurized oval gas slots 330-*b* urge gas pockets 332-*b* in diaphragm 334 upwards against bottom surface 336 of upper plate 306 to seal holes 302-*b* and prevent analytical gasses from flowing from ports 2 to 3, 4 to 5, 6 to 7, 8 to 9, and 10 to 1. Analytical gases push gas pockets 332-*a* down to allow gas flow through side holes 302-*a* thereby allowing flow through ports 1 to 2, 3 to 4, 5 to 6, 7 to 8, and 9 to 10 while depressurizing port 320. Gas pockets in diaphragm 334 may be naturally formed when applying pressurized sample gas and carrier gas to analytical ports on top of the top plates. Alternatively, the gas pockets in diaphragm 334 can be pre-formed.

By pressurizing either activation port 318 or 320, analytical gases can be switched to flow through one port or another.

FIG. 3D is an exploded perspective view of a multiport diaphragm valve in accordance with an embodiment of the present invention. FIG. 3D shows a pair of alignment pins 350, 352 that are received by holes in plates 306 and 308. Alignment pins 350, 352 also pass through alignment apertures 354, 356, respectively, in diaphragm 334.

Embodiments described herein generally provide a simple, compact multiport diaphragm-based valve for gas chromatography. Embodiments may provide a reduced part count and/or cost reduction in comparison to known designs.

Although the present invention has been described with reference to preferred embodiments, workers skilled in the art will recognize that changes may be made in form and detail without departing from the spirit and scope of the invention.

What is claimed is:

1. A multiport gas chromatograph valve comprising:

a first plate having a first plurality of ports and a second plurality of ports, wherein the first and second plurality of ports are interposed with one another such that each of the first plurality of ports has a pair of neighbors from the second plurality of ports and each of the second plurality of ports has a pair of neighbors from the first plurality of ports;

a second plate having a first activation port and a second activation port, the first activation port being fluidically coupled to a first plurality of gas slots, and wherein the second activation port is fluidically coupled to a second plurality of gas slots; and a diaphragm disposed between the first and second plates, the diaphragm having a first plurality of gas pockets that, when pressurized by the first plurality of gas slots, seals against the first plate to obstruct flow between each port of the first plurality of ports and a respective neighbor on a first side, and wherein the diaphragm has a second plurality of gas pockets that, when pressurized by the second plurality of gas slots, seals against the first plate to obstruct flow between each port of the first plurality of ports and a respective neighbor on a second side.

2. The multiport gas chromatograph valve of claim 1, wherein the first plurality of ports includes five ports and the second plurality of ports includes five ports.

3. The multiport gas chromatograph valve of claim 1, wherein the first plurality of ports consists of two ports and the second plurality of ports consists of two ports.

4. The multiport gas chromatograph valve of claim 1, wherein the first plurality of ports consists of four ports and the second plurality of ports consists of four ports.

5. The multiport gas chromatograph of claim 1, wherein the first plurality of ports consists of three ports and the second plurality of ports consists of three ports.

6. The multiport gas chromatograph valve of claim 2, wherein the first plurality of gas pockets includes five gas pockets, and wherein the second plurality of gas pockets includes five gas pockets.

7. The multiport gas chromatograph valve of claim 1, wherein the first activation port is fluidically coupled to the first plurality of gas slots through an inner gas channel.

8. The multiport gas chromatograph valve of claim 1, wherein the second activation port is fluidically coupled to the second plurality of gas slots through an outer gas channel.

9. The multiport gas chromatograph valve of claim 1, wherein the each port of the first and second plurality of ports includes a pair of holes, each pair of holes having a first side hole that is selectably blocked by a gas pocket of the first plurality of gas pockets and a second side hole that is selectably blocked by a gas pocket of the second plurality of gas pockets.

10. The multiport gas chromatograph valve of claim 1, and further comprising an alignment feature configured to align the first plate, second plate, and diaphragm to one another during assembly.

11. The multiport gas chromatograph valve of claim 10, wherein the alignment feature includes a plurality of alignment pins.

12. The multiport gas chromatograph valve of claim 1, wherein the first plate and second plate are clamped together.

13. The multiport gas chromatograph valve of claim 12, wherein the first plate and second plate are clamped together by a single mechanical fastener.

* * * * *